(12) United States Patent
Hwang et al.

(10) Patent No.: US 9,474,995 B2
(45) Date of Patent: Oct. 25, 2016

(54) FILTER ASSEMBLY AND FILTERING SYSTEM HAVING THE SAME

(71) Applicant: CARL FREUDENBERG KG, Weinheim (DE)

(72) Inventors: Kyungho Hwang, Pyeongtaek-si (KR); Sunguk Cho, Suwon-si (KR)

(73) Assignee: CARL FREUDENBERG KG, Weinheim (DE)

( * ) Notice: Subject to any disclaimer, the term of this patent is extended or adjusted under 35 U.S.C. 154(b) by 109 days.

(21) Appl. No.: 14/297,838

(22) Filed: Jun. 6, 2014

(65) Prior Publication Data

US 2015/0027313 A1    Jan. 29, 2015

(30) Foreign Application Priority Data

Jul. 29, 2013  (KR) ........................ 10-2013-0089787

(51) Int. Cl.
    *B01D 46/00*   (2006.01)
    *B01D 46/52*   (2006.01)
    *F24F 3/14*    (2006.01)
    *B01D 46/10*   (2006.01)
    *F24F 3/16*    (2006.01)

(52) U.S. Cl.
    CPC ......... *B01D 46/521* (2013.01); *B01D 46/0028* (2013.01); *B01D 46/0038* (2013.01); *B01D 46/10* (2013.01); *F24F 3/14* (2013.01); *F24F 3/1603* (2013.01)

(58) Field of Classification Search
    CPC .... B01D 46/88; B01D 46/444; B01D 46/10; B01D 46/38; F24F 3/1603
    See application file for complete search history.

(56) References Cited

U.S. PATENT DOCUMENTS

| | | | |
|---|---|---|---|
| 6,894,620 B2 * | 5/2005 | Reinhardt | B01D 46/0086 340/606 |
| 7,503,954 B2 | 3/2009 | Haefner et al. | |
| 2007/0261376 A1 * | 11/2007 | Elliot | B01D 46/0028 55/491 |
| 2011/0139006 A1 | 6/2011 | Mueller, Jr. | |

FOREIGN PATENT DOCUMENTS

| | | |
|---|---|---|
| DE | 102004025274 | 12/2004 |
| FR | 2920349 | 3/2009 |
| JP | 2002-1040 | 1/2002 |
| JP | 2002-065833 | 3/2002 |
| KR | 10-2005-0110227 | 11/2005 |
| KR | 10-2006-0121035 | 11/2006 |
| WO | 03/021154 | 3/2003 |

* cited by examiner

*Primary Examiner* — Jason M Greene
*Assistant Examiner* — Karla Hawkins
(74) *Attorney, Agent, or Firm* — Grossman, Tucker, Perreault & Pfleger, PLLC (57) ABSTRACT

Filter assemblies and filtering systems including the same are disclosed. In some embodiments the filter assemblies and systems include a diffusion member and first and second pleated parts, wherein the first and second pleated parts include different first and second peak heights h1 and h2, respectively. In some instances h1 is greater than h2, and h2 and the thickness of the diffusion member are set such that an upper surface of the diffusion member does not extend past said first upper peaks when the diffusion member is seated in a seating place defined by a seating place that is at least partly defined by the second pleated part. The filter assemblies and systems may also be configured such that an air flow filtered by said second pleated part passes through said diffusion member.

11 Claims, 5 Drawing Sheets

FILTER ASSEMBLY AND FILTERING SYSTEM HAVING THE SAME

TECHNICAL FIELD

The present invention relates to a filter assembly and to a filtering system having the same, more specifically, the present invention relates to a filter assembly and to a filtering system having the same which are designed for installation in a device, such as an air purifier, an air conditioning system, a vacuum cleaner or a fluid filtering system, through which a flow of air that has been fed in exits, and for filtering foreign particles out of the air flow.

BACKGROUND OF THE INVENTION

Buildings, automobiles, vacuum cleaners, air purifiers, air conditioning systems and fluid filtering systems are equipped on their interior with a filter for filtering out all types of foreign particles, such as dust, which are contained in the air or the fluid that is fed in.

Such filters are ordinarily made of non-woven fabric with zigzag-type pleats.

In reference to one such filter, U.S. Pat. No. 7,503,954, filed and registered by the above applicants, proposes a "filter element"; said patent relates specifically to a filter element made of non-woven fabric, wherein the filter element comprises a "filter web" that is pleated in a zigzag manner, which is inserted into a holder such as a filter frame and/or a filter housing having a flat wall in at least one end position, said filter element having at least one front end face, viewed in the direction of the pleats, with the front end face corresponding to the flat wall of the holder, and as a consequence, the filter element has the advantage that the front end face of the filter element is curved outward in a convex manner, and the material of the filter web being selected such that the filter web can be inserted into the holder without corrugation, with the filter web firmly contacting the end wall of the holder as a result of elastic pre-tension, and/or the front end face being "conditioned".

However, with conventional filters, including that of U.S. Pat. No. 7,503,954, the problem exists that after a certain amount of time, foreign particles such as dust, etc. can collect on the surface of the side along which the air flow is fed, and as a result, the openings in the filter become clogged and filtration efficiency deteriorates, and liquid foreign particles or solid foreign particles that have been deposited in the filter decompose, resulting in contamination or odors in the filtered air flow.

Moreover, U.S. Pat. No. 6,894,620, filed and registered by the above applicants, proposes a "method and device for monitoring the service life of a filter", specifically a filter in a filtering device installed in a fan, in particular, a method for monitoring the service life of a filter in the air conditioning system of an automobile; in this case, said filters are preferably designed such that whenever the device is in operation, the actual air speed in the bottom region of the filter is measured by a sensor, compared with the normal air speed of the filter when not in use, and transmitted to the service device and/or displayed on the display device, and, if the predetermined threshold value or threshold range of the actual air speed is not reached, a signal indicating that the filter should be replaced is emitted.

The problem exists, however, that as the filter is being used, a gap can form between the edge of the filter and the filtering device in which the filter is installed, and this gap can result in a change in the air flow, and, because in conventional filtering devices a sensor measures the change in the air flow resulting from this gap, measurement errors occur, and as a result, the sensor is unable to measure the replacement interval for the filter.

DESCRIPTION OF THE INVENTION

Problems Addressed

The object of the present invention is to provide a filter assembly and a filtering system having the same, to which the function of aromatic substances, antibacterial agents and dehumidifying agents is added, in which filtering is carried out throughout the entire region in which the flow of air moves, and with which the replacement interval for aromatic substances, etc. can be easily and effectively measured.

Solution

The above object is attained according to the present invention by means of a filter assembly, which is characterized in that it comprises a first pleated part having zigzag-type pleats continuously formed thereon; a second pleated part having zigzag-type pleats continuously formed thereon and being connected adjacently to the said first pleated part, said second pleated part being formed with a height lower than that of said first pleated part so as to provide a seating place; a pair of end strips connected to the two ends of said first and second pleated parts along the length of the pleat; and a diffusion member, which is seated in said seating place, and in that the flow of air that is filtered by said second pleated part passes through said diffusion member.

Said diffusion member can be encompassed by said first pleated part and said pair of end strips.

Said diffusion member can be snugly fitted between said pair of end strips.

Said diffusion member can be attached to more than one said first pleated part and to said end strip by attaching means.

Said attaching means can consist of hook-and-loop tape (Velcro), double-sided tape or adhesive.

Said diffusion member can be designed such that it does not protrude beyond said first pleated part or said end strips in the direction of filtering of the air flow.

Said diffusion member can be designed such that it consists of a functional diffusion substance which diffuses through the air flow; and a cartridge, which contains said functional diffusion substance and is formed with a plurality of through-holes on its surface.

Said functional diffusion substance can consist of aromatic substances, antibacterial agents or dehumidifying agents.

Said cartridge can have more than two isolated internal cavities, each for accommodating a different one of said functional diffusion substances.

The zigzag-type pleats of said first pleated part and said second pleated part can be designed such that the zigzag-type pleats of said first pleated part have one constant height and those of said second pleated part have another constant height on one side of said seating place, while all pleats have the same constant height on the other side of said seating place.

The above object is further attained by a filtering system which is characterized in that it comprises the above-described filter assembly; a diffusion substance measuring sensor, which is installed at one side of the filter channel in which said filter assembly is installed and measures the flow of air that passes through said filter assembly; a control unit for receiving the measured values from said diffusion substance measuring sensor; and a display unit for displaying said measured values by means of said control unit.

Action of the Invention

According to the present invention, filtering is carried out throughout the entire region in which the flow of air moves because the invention is equipped with a diffusion member, which is seated in the seating place, and the function of aromatic substances, antibacterial agents and dehumidifying agents is added; and the replacement interval for the aromatic substances, etc. can be easily and effectively measured in that the invention is equipped with a diffusion substance measuring sensor, which is installed in the exhaust path of the filter channel in which said filter assembly is installed and measures the flow of air that passes through the filter assembly.

DETAILED DESCRIPTION OF THE INVENTION

In the following, preferable embodiment examples of the present invention will be specified in detail with reference to the attached set of drawings. However, functions or structures that are already known have been omitted from the specification of the invention so as to make the essential features of the present invention more clear.

In the filter assembly and in the filtering system comprising said filter assembly, according to the present invention, filtering is carried out throughout the entire region in which the flow of air moves, and a function of aromatic substances, antibacterial agents and dehumidifying agents is added, and the replacement interval for aromatic substances, etc. is easily and effectively measured.

Figure 1:
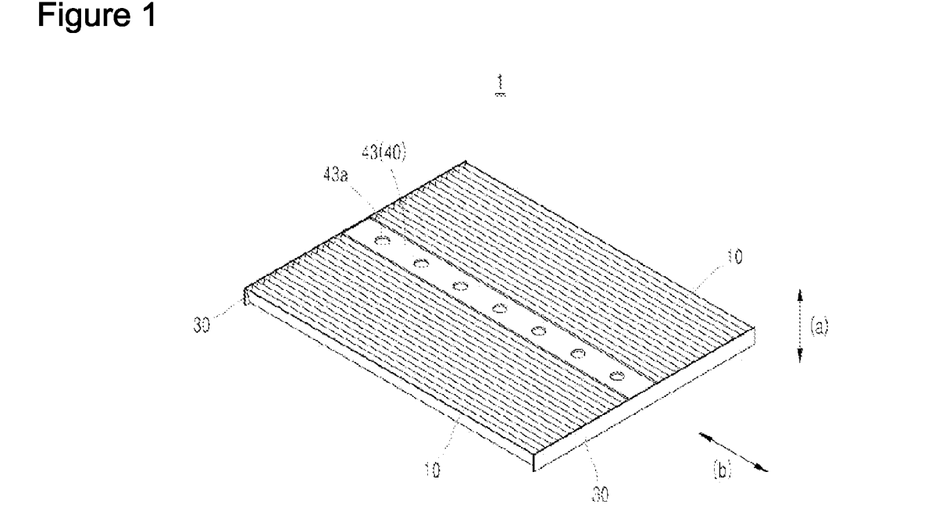
FIG. 1 shows an installed filter assembly in the context of one embodiment example of the present invention.
Figure 2:
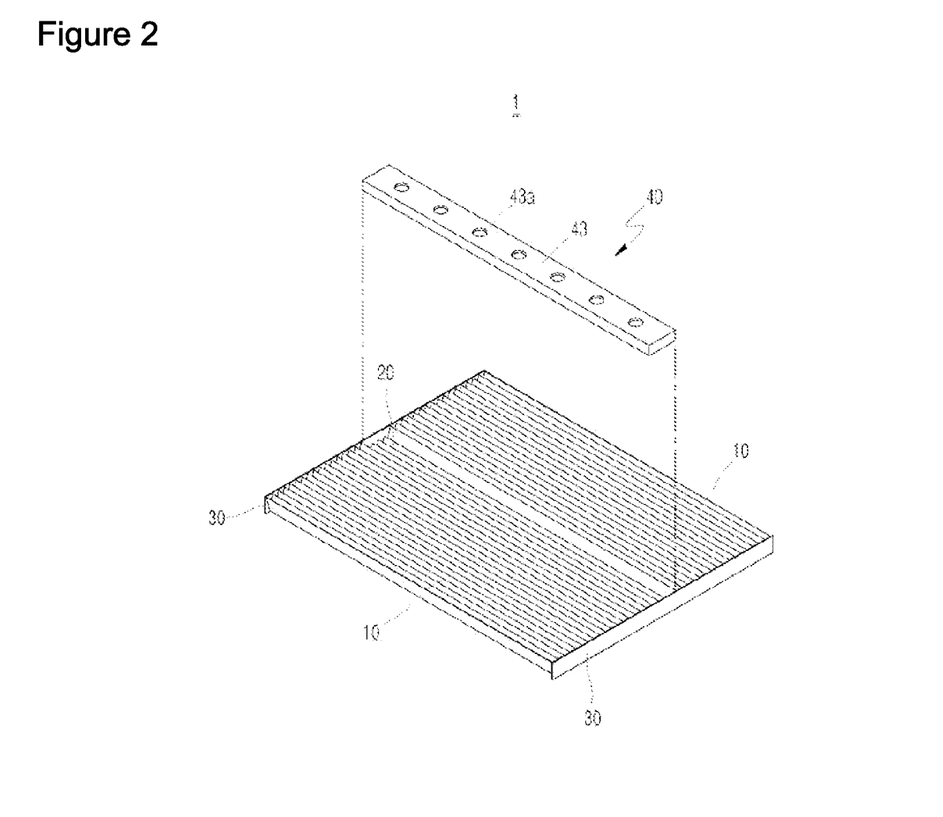
FIG. 2 shows the overall design of the filter assembly shown in FIG. 1.
Figure 3:
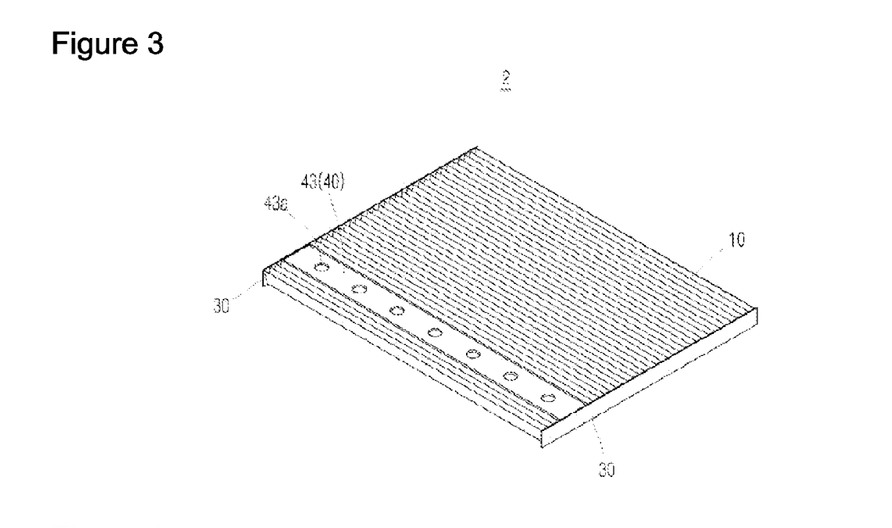
FIG. 3 shows an installed filter assembly in the context of another embodiment example of the present invention.
Figure 4:
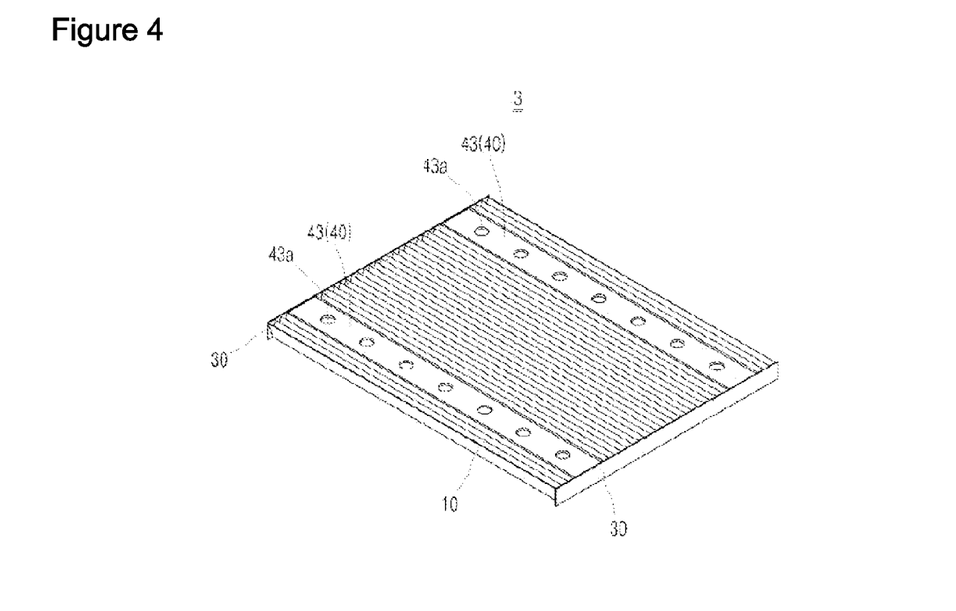
FIG. 4 and FIG. 5 show an installed filter assembly in the context of further embodiment examples of the present invention.
Figure 5:
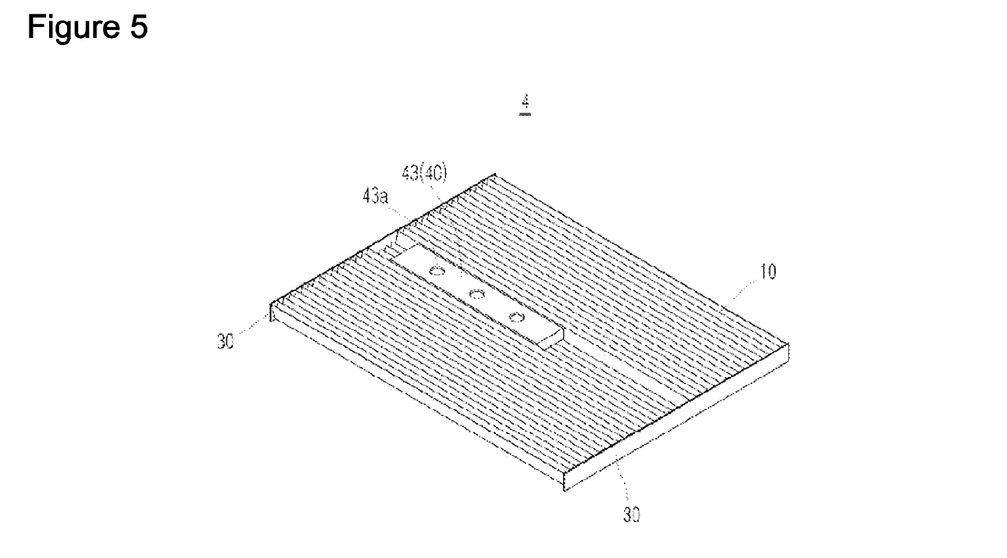
Figure 6:
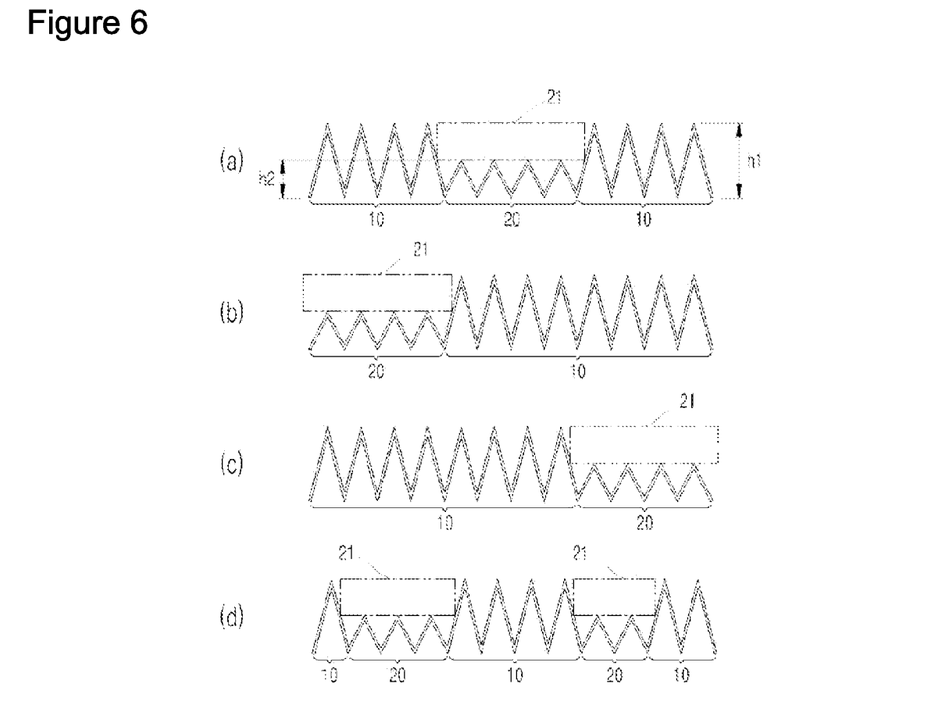
FIG. 6a shows a cross-section of the first pleated part and the second pleated part of the filter assembly shown in FIG. 1.
FIG. 6b and FIG. 6c show a cross-section of the first pleated part and the second pleated part of the filter assembly shown in FIG. 3.
FIG. 6d shows a cross-section of the first pleated part and the second pleated part of the filter assembly shown in FIG. 4.
Figure 7:
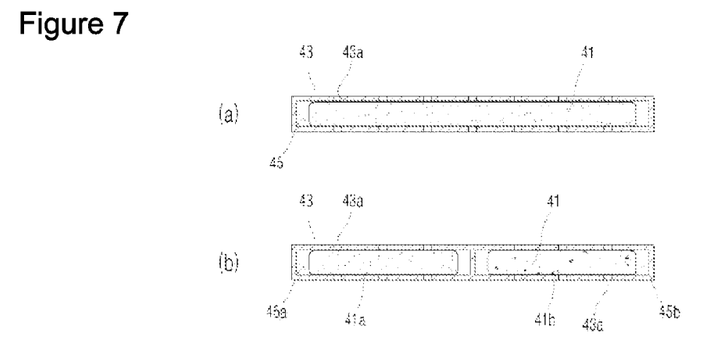
FIG. 7a and FIG. 7b show a cross-section of the diffusion member of the filter assembly shown in FIG. 1.
Figure 8:
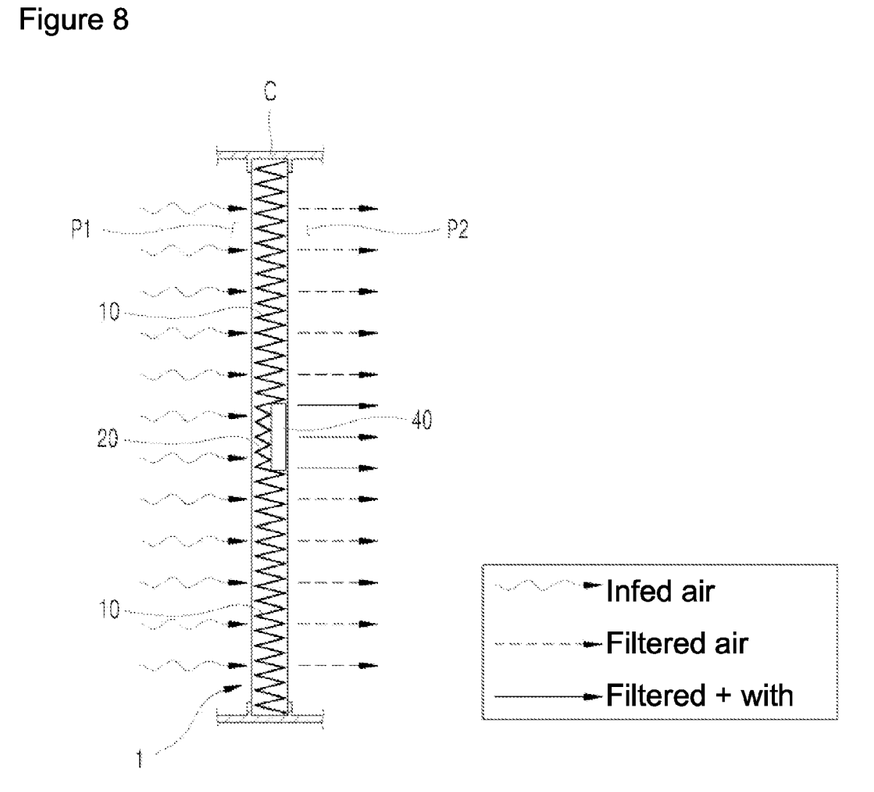
FIG. 8 shows the state in which the filter assembly shown in FIG. 1 is installed in the filter channel.
Figure 9:
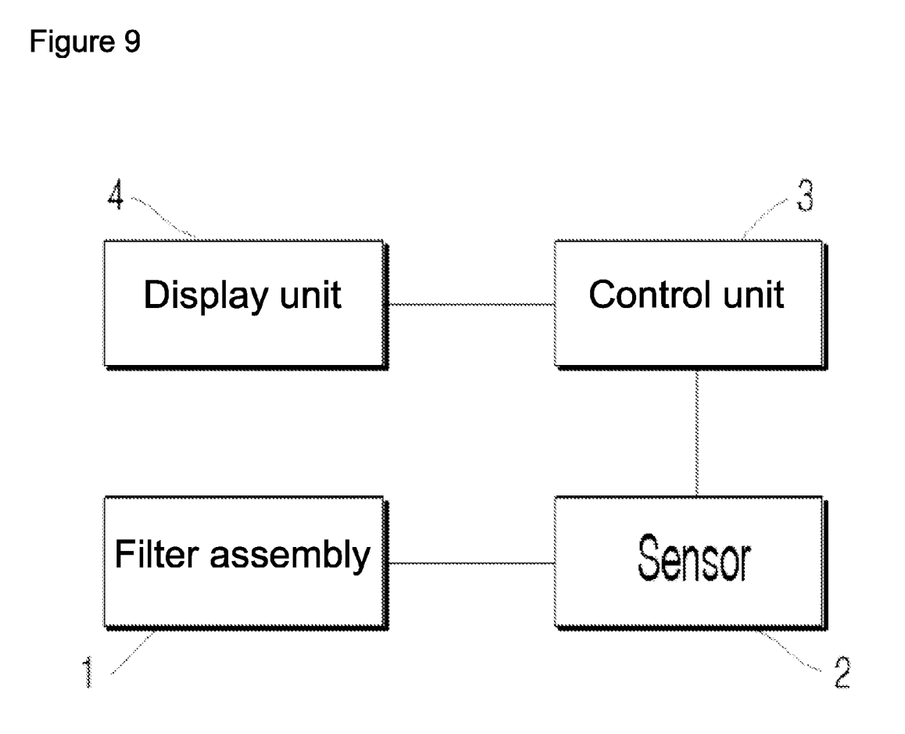
FIG. 9 is a diagram illustrating a filtering system which comprises a filter assembly in the context of a further embodiment example of the present invention.

FIG. 1 shows the installed filter assembly in the context of one embodiment example of the present invention, FIG. 2 shows the overall design of the filter assembly shown in FIG. 1, FIG. 3 shows the installed filter assembly in the context of another embodiment example of the present invention, FIG. 4 and FIG. 5 show the installed filter assembly in the context of additional embodiment examples of the present invention, FIG. 6a shows a cross-section of the first pleated part and the second pleated part of the filter assembly shown in FIG. 1, FIG. 6b and FIG. 6c show a cross-section of the first pleated part and the second pleated part of the filter assembly shown in FIG. 3, FIG. 6d shows a cross-section of the first pleated part and the second pleated part of the filter assembly shown in FIG. 4, FIG. 7a and FIG. 7b show a cross-section of the diffusion member of the filter assembly shown in FIG. 1, FIG. 8 shows the state in which the filter assembly shown in FIG. 1 is installed in the filter channel, and FIG. 9 is a diagram showing a filtering system which comprises a filter assembly according to a further embodiment example of the present invention.

As is clear from FIG. 1 and FIG. 2, the filter assembly (1) according to the present invention consists of a first pleated part (10), a second pleated part (20), an end strip (30) and a diffusion member (40).

In the specification of the filter assembly (1) according to the present invention, the upper and lower direction (a) is defined and described on the basis of the filter assembly (1) as shown in FIG. 1.

The first pleated part (10) and the second pleated part (20) correspond to the parts of conventional filters; they can be made of non-woven fabric and together form a single element.

The first pleated part (10) has zigzag-type pleats continuously formed thereon.

The individual pleated parts of the top side and the bottom side of the first pleated part (10) can have different heights, however, it is desirable for them to have a uniform height (h1), as shown in FIG. 6a.

The second pleated part (20) is connected directly to the first pleated part (10), in reference to FIG. 6a, and has zigzag-type pleats formed continuously thereon, with the height (h2) of said part being lower than that of the first pleated part (10), thereby forming a seating place (21). In other words, the thickness (h1) of the first pleated part (10) and the thickness (h2) of the second pleated part (20) are different, specifically, the thickness (h2) of the part that forms the second pleated part (20) is thinner than the thickness (h1) of the part that forms the first pleated part (10).

In this manner, the height of the second pleated part (20) is designed to be lower than the height of the first pleated part (10) thereby creating the seating place (21) in the form of a depression, and, referring to FIG. 2, the diffusion member (40) is seated in such a seating place (21).

The individual pleated parts of the top side and the bottom side of the second pleated part (20) can have different heights; however, it is desirable for them to have a constant height as shown in FIG. 6a. It is further desirable for the bottom side of the second pleated part (20) and the bottom side of the first pleated part (10) to be designed such that they are constant. However, the top side of the second pleated part (20) is not the same as the top side of the first pleated part (10), and is instead lower than the top side of the first pleated part (10), as described above.

As shown in FIG. 6a, the second pleated part (20) can be formed between the first pleated part (10) or, as shown in FIGS. 6b and 6c, can be formed on one side of the first pleated part (10), and, as shown in FIG. 6d, the first pleated part (10) and the second pleated part (20) can be formed at intervals. FIG. 3 and FIG. 4 illustrate the case in which the diffusion member (40) is seated on the top side of the second pleated part (20) that is formed at different locations in this manner.

As illustrated in FIG. 1 and FIG. 2, the end strip (30) is connected to the two ends along the pleating direction (b) of the first pleated part (10) and the second pleated part (20). The end strip (30) usually consists of a flat strip and is connected to the two ends of the first pleated part (10) and the second pleated part (20). In this manner, the end strip (30) is connected to the ends of the first pleated part (10) and the second pleated part (20), thereby maintaining the pleated condition of the first pleated part (10) and the second pleated part (20), and also preventing any rotation or alteration of the filter assembly (1).

The bottom side of the end strip (30) either has the same height as the bottom side of the first pleated part (10) and the second pleated part (20) or projects somewhat beyond the bottom side, and the top side of the end strip (30) either has the same height as the top side of the first pleated part (10) or projects somewhat beyond the top side. One such end strip (30), along with the first pleated part (10), forms the boundary of the seating place (21) at the point where the second pleated part (20) is formed.

Referring to FIG. 1, FIG. 2 and FIG. 7a, the diffusion member (40), which is seated in the seating place (21), consists of diffusion substance (41) and a cartridge (43).

The diffusion substance (41) can consist of aromatic substances, antibacterial agents or dehumidifying agents.

The cartridge (43) contains the diffusion substance (41), and ordinarily consists of a box in the form of a hexahedron, on both sides of which, corresponding to the direction of air flow, a plurality of through holes (43a) are formed. The diffusion substance (41) contained within the cartridge (43) diffuses through these through holes (43a) during filtering, and performs an aromatic function, an antibacterial function or a dehumidifying function.

The function of the diffusion substance (41) can be to signal the replacement interval for the first pleated part (10) and the second pleated part (20). In other words, the diffusion substance (41) is used as an aromatic substance, and, because the cavities (45) are filled with a suitable quantity of aromatic substance that corresponds to the period of use of the first pleated part (10) and the second pleated part (20), users are able to determine the replacement interval for the first pleated part (10) and the second pleated part (20) based upon the aroma.

As shown in FIG. 7b, more than 2 separate cavities (45) can be provided inside the cartridge (43). The interior of the cartridge (43) can be subdivided into a first cavity (45a) and a second cavity (45b), so that, for example, the first cavity (45a) can contain an aromatic substance (41a) and the second cavity (45b) can contain an antibacterial agent (41b), thereby preventing the aromatic substance (41a) and the antibacterial agent (41b) from becoming intermixed, and guaranteeing that the respective diffusion substance can function effectively.

In this case, it goes without saying that the through holes (43a) on the first cavity (45a) and the second cavity (45b) are formed separately.

The diffusion member (40), when seated in the seating place (21), is encompassed by the top side of the first pleated part (10) and the end material.

As shown in FIG. 8, air purifiers, air conditioning systems, vacuum cleaners and fluid filtering systems are equipped on their interior with a filter channel (C), through which the infed air flows, and the filter assembly (1) is connected to one side of the filter channel (C).

The diffusion member (40) is designed such that, when it is seated in the seating place (21), it does not protrude further in the filtering direction of the air flow than the first pleated part (10) and the end strip (30), as illustrated in FIG. 1 and FIG. 6a. As a result, when the filter assembly (1) is connected to the filter channel (C), the diffusion member (40) does not come into contact with the filter channel (C), and the filter assembly (1) can be connected to conventional filter channels (C), and after the connection, the diffusion member (40) does come into contact with the filter channel (C), as a result of which any movement of the diffusion member (40) in the direction of flow of the air flow is prevented.

Referring to FIG. 1, FIG. 2 and FIG. 6a, it is desirable for the diffusion member (40) to be seated securely and precisely in the seating place (21). In other words, each of the two sides in the direction of pleating (b), which lead to the end strip (30) of the diffusion member (40), contacts the inner surface of the end strip (30), and the two sides that lead to the first pleated part (10) contact the end of the first pleated part (10).

The diffusion member (40) is formed as short in the direction of pleating (b), as shown in FIG. 5, and can therefore be attached only by the two ends of the first pleated part (10), wherein it is desirable for said diffusion member to be attached by the attaching means described in the following.

For the stable attachment of the diffusion member (40), the diffusion member (40) can be attached with more than one first pleated part (10) and end strip (30) by means of attaching means (not shown). That is, more than one marginal surface of the diffusion member (40) can be attached to the first pleated part (10) and to the end strip (30) by attaching means.

Said attaching means can consist of hook-and-loop tape (Velcro), double-sided tape or adhesive.

The attaching means used between the second pleated part (20) and the diffusion member (40), because they prevent the flow of air, can diminish the functioning of the second pleated part (20) and the diffusion member (40), and therefore, it is desirable for the attaching means not to be used between the diffusion member (40) and the second pleated part (20).

As mentioned above, a filter assembly (1) according to the present invention can be designed such that, as a result of the diffusion member (40), in particular, as a result of the decrease in the aromatic substance, the replacement interval of the filter assembly (1) can be identified, or a measuring sensor (2) measures the volume diffused by the diffusion member (40), thereby indicating the replacement time for the filter assembly (1).

As is shown in FIG. 9, a filtering system according to another embodiment example of the present invention consists of a filter assembly (1), a diffusion substance measuring sensor (2), a control unit (3) and a display unit (4).

The flow of air that is fed to the filter channel (C) passes through the filter assembly (1), as shown in FIG. 8, and is filtered, in which process, the flow of air that passes through the second pleated part (20) passes back through the diffusion member (40) and picks up the diffusion substance (41).

The diffusion substance measuring sensor (2) is installed at one side of the exhaust path (P2) of the filter channel (C) in which the flow of air that has passed through the filter assembly (1) and has been filtered flows, and measures the diffusion substance (41) of the air flow that has passed through the filter assembly (1). The diffusion substance measuring sensor (2) measures the density of the aromatic substances, the antibacterial agents or the dehumidifying agents which are contained in the filtered air that flows through the exhaust path (P2). Reference sign P1, which is not defined, indicates the infeed path of the filter channel (C).

The control unit (3) is connected to the diffusion substance measuring sensor (2) and receives the signals from the diffusion substance measuring sensor (2). According to preprogrammed control commands, the control unit (3) converts the signals from the diffusion substance measuring sensor (2), and the signals are displayed by the display unit (4).

The display unit (4) is installed on one side of the device, such as an air purifier, an air conditioning system, a vacuum cleaner or a fluid filtering system, through which the air flow exits after it has been fed in, and said display unit displays the signals from the diffusion substance measuring sensor (2) that have been converted by the control unit (3). The display can be implemented in visual form as the quantity of diffusion substance (41), the replacement time, a warning signal, etc., or in acoustic form as an alarm signal or warning signal. Users can easily ascertain the replacement interval for the filter assembly (1) by means of the display unit (4).

According to the present invention, filtering is carried out throughout the entire region in which the air flow moves, in that the invention is equipped with a diffusion member (40) which is seated in the seating place (21), and a function of aromatic substances, antibacterial agents and dehumidifying agents is added, and the replacement interval for the aromatic substances, etc. can be easily and effectively measured by virtue of the fact that the invention is equipped with a diffusion substance measuring sensor (2), which is installed in the exhaust path (P2) of the filter channel (C) in which the filter assembly (1) is installed, and measures the flow of air that passes through the filter assembly (1).

In the above, certain embodiment examples of the present invention have been specified and presented, however, the present invention is not limited to the embodiment examples described here, and, as is obvious to anyone with routine knowledge in this technical field, a multitude of modifications and alterations are possible without deviating from the concept and the field of the present invention. Therefore, such modified or altered examples are not intended to be considered separately from the technical concept or the viewpoint of the present invention, and the modified embodiment examples must be covered by the scope of the claims of the present invention.

| [List of Reference Signs] | |
|---|---|
| 1: Filter assembly | 2: Diffusion substance measuring sensor |
| 3: Control unit | 4: Display unit |
| C: Filter channel | 10: First pleated part |
| 20: Second pleated part | 30: End strip |
| 21: Seating place | 40: Diffusion member |
| 41: Functional diffusion substance | 43: Cartridge |
| 45: Cavity | |

What is claimed is:

1. A filter assembly, comprising:
a first pleated part comprising first zigzag-type pleats said first zig-zag-type pleats comprising first lower peaks and first upper peaks and having a first peak height, h1, that is defined by a distance between at least one of said first lower peaks and at least one of said first upper peaks;
a second pleated part comprising second zigzag-type pleats, the second zig-zag type pleats comprising second lower peaks and second upper peaks and having a second peak height, h2, that is defined by a distance between at least one of said second lower peaks and at least one of said second upper peaks, said second pleated part being adjacent and connected to said first pleated part, the second pleated part at least partially defining a seating place; said first and second pleated parts each comprising first and second ends and a length;
a pair of end strips connected to the first and second ends of said first and second pleated parts along the length thereof; and
a diffusion member seated in said seating place such that at least a portion of the diffusion member is seated on at least one of said second upper peaks, said diffusion member having a thickness; wherein:
said first and second upper peaks face an inlet side of said filter assembly;
said first and second lower peaks face an outlet side of said filter assembly;
h1 is greater than h2;
h2 and the thickness of the diffusion member are set such that an upper surface of the diffusion member does not extend past said first upper peaks when the diffusion member is seated in said seating place; and
said filter assembly is configured such that an air flow filtered by said second pleated part passes through said diffusion member.

2. The filter assembly as claimed in claim 1, wherein said diffusion member is encompassed by said first pleated part and said pair of end strips.

3. The filter assembly as claimed in claim 2, wherein said diffusion member is snugly fitted in between said pair of end strips.

4. The filter assembly as claimed in claim 2, wherein said filter assembly comprises a plurality of first pleats parts, wherein said diffusion member is disposed within said seating place and is attached to more than one said plurality of first pleated parts and said end strip by attaching means.

5. The filter assembly as claimed in claim 4, wherein said attaching means is hook-and-loop tape (Velcro), double-sided tape, or adhesive.

6. The filter assembly as claimed in claim 2, wherein h2 and the thickness of said diffusion member are configured such that said diffusion member does not protrude beyond said end strips on the outlet side of said filter assembly.

7. The filter assembly as claimed in claim 1, wherein said diffusion member comprises:
a functional diffusion substance that diffuses through the air flow; and
a cartridge which contains said functional diffusion substance and is formed with a plurality of through-holes on its surface.

8. The filter assembly as claimed in claim 7, wherein said functional diffusion substance consists of aromatic substances, antibacterial agents, or dehumidifying agents.

9. The filter assembly as claimed in claim 8, wherein said cartridge is provided with more than two isolated internal cavities, each for containing a different one of said functional diffusion substances.

10. The filter assembly as claimed in claim 1, wherein the first pleat height, h1, of the first zigzag-type pleats is a first constant height and the second pleat height, h2, of the second zigzag-type pleats is a second constant height.

11. A filtering system, comprising:
a filter assembly, the filter assembly comprising:
- a first pleated part comprising first zigzag-type pleats said first zig-zag-type pleats comprising first lower peaks and first upper peaks and having a first peak height, h1, that is defined by a distance between at least one of said first lower peaks and at least one of said first upper peaks;
- a second pleated part comprising second zigzag-type pleats, the second zig-zag type pleats comprising second lower peaks and second upper peaks and having a second peak height, h2, that is defined by a distance between at least one of said second lower peaks and at least one of said second upper peaks, said second pleated part being adjacent and connected to said first pleated part, the second pleated part at least partially defining a seating place; said first and second pleated parts each comprising first and second ends and a length;
- a pair of end strips connected to the first and second ends of said first and second pleated parts along the length thereof; and
- a diffusion member seated in said seating place such that at least a portion of the diffusion member is seated on at least one of said second upper peaks, said diffusion member having a thickness;

wherein:
- said first and second upper peaks face an inlet side of said filter assembly;
- said first and second lower peaks face an outlet side of said filter assembly;
- h1 is greater than h2;
- h2 and the thickness of the diffusion member are set such that an upper surface of the diffusion member does not extend past said first upper peaks when the diffusion member is seated in said seating place; and
- said filter assembly is configured such that an air flow filtered by said second pleated part passes through said diffusion member;

the filtering system further comprising:
- a diffusion substance measuring sensor installed at one side of a filter channel in which said filter assembly is installed, the diffusion substance measuring sensor configured to measure a flow of air passing through said filter assembly;
- a control unit configured to receive measured values of the flow of air from said diffusion substance measuring sensor; and
- a display unit configured to display said measured values.

* * * * *